(12) United States Patent
Cordaro et al.

(10) Patent No.: US 9,075,148 B2
(45) Date of Patent: Jul. 7, 2015

(54) NANO STRUCTURAL ANODES FOR RADIATION DETECTORS

(75) Inventors: Joseph V. Cordaro, Martinez, GA (US); Steven M. Serkiz, Aiken, SC (US); Christopher S. McWhorter, Evans, GA (US); Lindsay T. Sexton, Aiken, SC (US); Scott T. Retterer, Knoxville, TN (US)

(73) Assignee: SAVANNAH RIVER NUCLEAR SOLUTIONS, LLC, Aiken, SC (US)

( * ) Notice: Subject to any disclaimer, the term of this patent is extended or adjusted under 35 U.S.C. 154(b) by 592 days.

(21) Appl. No.: 13/427,254

(22) Filed: Mar. 22, 2012

(65) Prior Publication Data

US 2012/0241632 A1 Sep. 27, 2012

Related U.S. Application Data

(60) Provisional application No. 61/466,233, filed on Mar. 22, 2011.

(51) Int. Cl.
| | |
|---|---|
| *G01T 1/18* | (2006.01) |
| *H01J 47/00* | (2006.01) |
| *G01T 3/00* | (2006.01) |
| *G01T 1/185* | (2006.01) |
| *B82Y 15/00* | (2011.01) |
| *B82Y 30/00* | (2011.01) |

(52) U.S. Cl.
CPC . *G01T 1/18* (2013.01); *G01T 3/008* (2013.01); *G01T 1/185* (2013.01); *B82Y 15/00* (2013.01); *B82Y 30/00* (2013.01)

(58) Field of Classification Search
CPC ......... G01T 3/008; G01T 1/185; B82Y 15/00
USPC .......................................................... 250/374
See application file for complete search history.

(56) References Cited

U.S. PATENT DOCUMENTS

| | | | |
|---|---|---|---|
| 2006/0163077 A1* | 7/2006 | Yokomichi ................... | 205/170 |
| 2009/0014636 A1* | 1/2009 | Luling et al. ................. | 250/256 |
| 2010/0059684 A1* | 3/2010 | Maltz ............................ | 250/389 |
| 2010/0253359 A1* | 10/2010 | Boutchich et al. ........... | 324/459 |

(Continued)

FOREIGN PATENT DOCUMENTS

WO WO 2009066220 A1 * 5/2009

OTHER PUBLICATIONS

Kotani, et al.; Development of a new radiation detector utilizing CNTs as anodes; Science direct www.sciencedirect.com; Physics E 29 (2005) 505-509; Elesvier BC Jul. 25, 2005; Department of Physics, Tokyo Tech 2-12-1 O-okayama Meguro, Tokyo 152-8551 Japan.

(Continued)

*Primary Examiner* — David Porta
*Assistant Examiner* — Jeremy S Valentiner
(74) *Attorney, Agent, or Firm* — J. Bennett Mullinax, LLC

(57) ABSTRACT

Anodes for proportional radiation counters and a process of making the anodes is provided. The nano-sized anodes when present within an anode array provide: significantly higher detection efficiencies due to the inherently higher electric field, are amenable to miniaturization, have low power requirements, and exhibit a small electromagnetic field signal. The nano-sized anodes with the incorporation of neutron absorbing elements (e.g., $^{10}B$) allow the use of neutron detectors that do not use $^3He$.

8 Claims, 6 Drawing Sheets

(56) References Cited

U.S. PATENT DOCUMENTS

2010/0301196 A1* 12/2010 Chu et al. ............... 250/251
2011/0081724 A1*  4/2011 Swager et al. ........... 436/57
2011/0266521 A1* 11/2011 Ferrari et al. ............ 257/14
2012/0049054 A1*  3/2012 Zhou et al. ............. 250/265

OTHER PUBLICATIONS

Devol, et al.; Toward a carbon nanotube anode gas-filled radiation detector; Nucl. Instr. and Meth.A (2010), doi:10.1016/j.nima.2010.08.032; Journal homepage www.wlsevier.com/locate.nima.

* cited by examiner

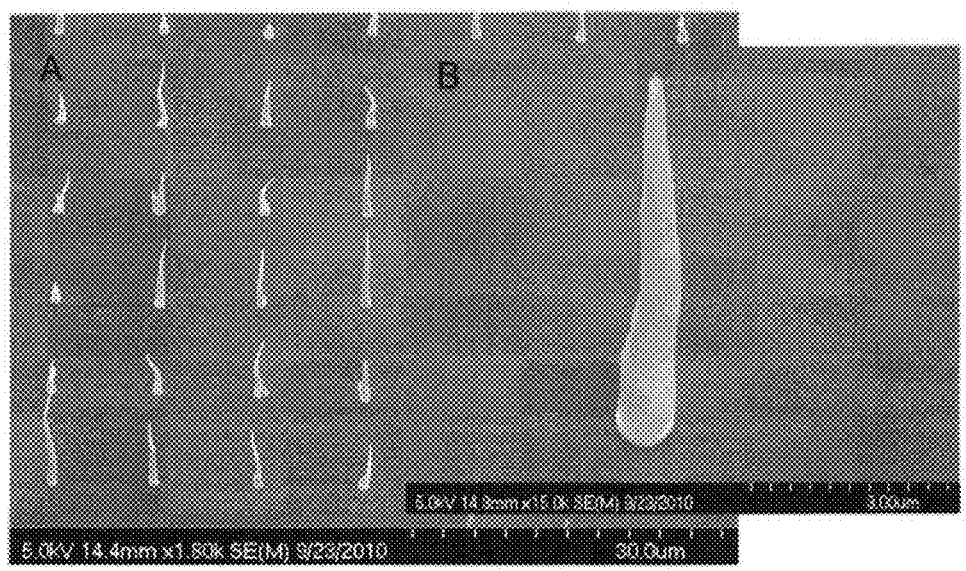
Figure 1A Scanning electron micrograph (SEM) image of a VACNF array with a 10 mircon pitch. Figure 1B SEM image of a single VACNF.

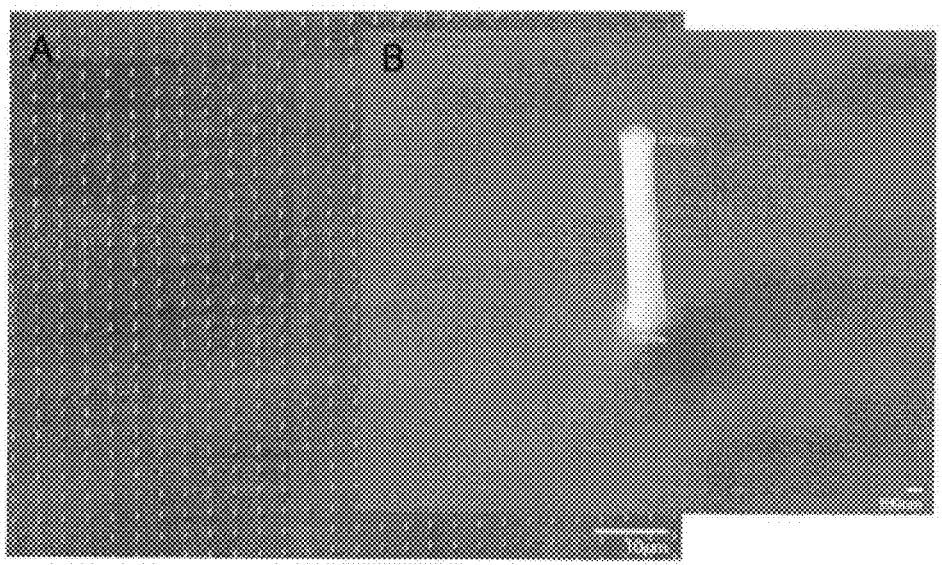
Figure 2A SEM image of a Si post array with a 3 mircon pitch. Figure 2B SEM image of a single Si post.

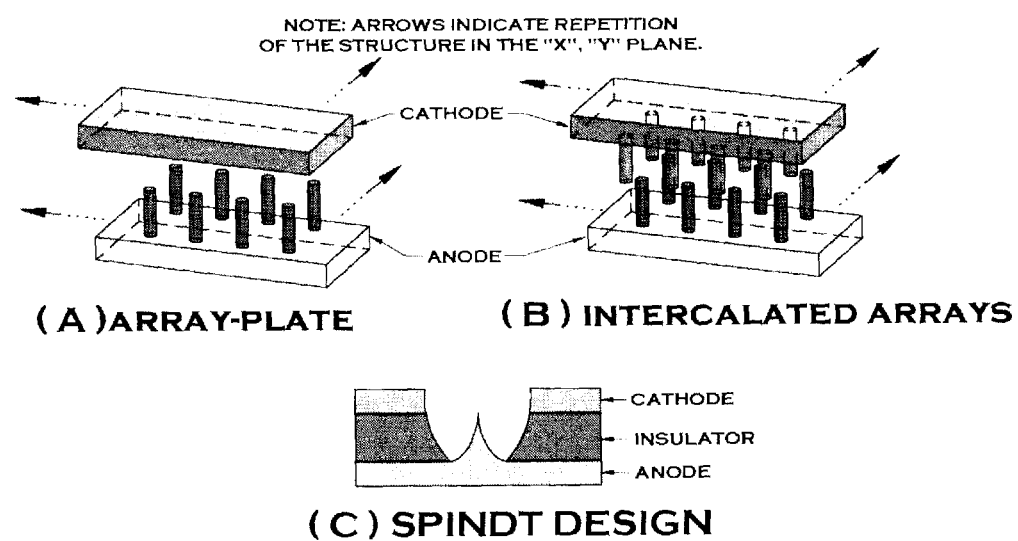
Figure 7A-7C. Anode/cathode configurations

NANO STRUCTURAL ANODES FOR RADIATION DETECTORS

RELATED INVENTIONS

This application claims the benefit of U.S. Provisional Application No. 61/466,233 filed on Mar. 22, 2011 in which is incorporated herein by reference.

STATEMENT AS TO RIGHTS TO INVENTIONS MADE UNDER FEDERALLY SPONSORED RESEARCH AND DEVELOPMENT

This invention was made with Government support under Contract No. DE-AC09-08SR22470 awarded by the United States Department of Energy. The Government has certain rights in the invention.

FIELD OF THE INVENTION

This invention is directed towards the use of small diameter anodes such as carbon fibers, carbon nanotubes, and nanostructured Si wafers which are useful as anodes in radiation detection devices.

BACKGROUND OF THE INVENTION

Proportional radiation counters (PCs) rely upon a sealed gas-filled device with an electrical potential applied across the gas in which a penetrating radiation, such as gamma rays or neutrons, penetrate the outer PC structure and ionize fill gas molecules. Other PCs operate in a "flow-through" mode where the sample is introduced into the interior of the PC to allow for the analysis of low-penetrating radiation such as beta particles. In this mode, however, PCs are highly accurate, but are limited as to materials that can be analyzed. PCs are designed to operate in a pulse mode and depend upon gas multiplication to amplify the charge from the ion pair created by ionizing radiation in the gas phase. The generated pulse is proportional to the energy of the radiation and is a basis for radiation spectroscopy.

PCs are comprised of an anode and a cathode, with the cathode often forming part of the outer PC structure. The ionized gas, present as electrons or free radicals, is collected as an electrical charge at the anode. Typically, a PC is filled with a noble gas or a noble gas containing mixture which limits free radical quenching. Gas multiplication is the result of increasing the electrical field within the PC to a sufficiently high value such that the ionized radical interacts with the fill gas causing a secondary ionization. This results in a cascade of ionization events, forming an electron avalanche that is detected at the anode in a process very similar to a photoionization (i.e., photomultiplier) detector. This signal amplification is the basis for the detection of conventional PC designs.

One limitation of conventional PCs is the reliance on high stable voltage sources used to produce the electric field required to reach the proportional counting region. The high voltage requirements have been a limitation for portable and remotely deployable PCs. While step-up transformers can increase the voltage needed for portable PCs, this process inherently adds noise to the measurement and reduces measurement sensitivity. In addition, there still remains a need for detection devices which are portable, have a high detection efficiency, operate on portable power supplies for extended periods of time, and exhibit a smaller electromagnetic field signal. Accordingly, there is room for variation and improvement in the art.

SUMMARY OF THE INVENTION

One aspect of one of the present embodiments of the invention is to provide for a PC having nano-sized anodes without sacrificing the sensitivity of the PC.

It is a further and more particular aspect of at least one embodiment of the present invention to provide for a PC having anodes constructed of carbon nanofibers or nanotubes.

It is yet a further aspect of at least one embodiment of the present invention to provide for nano-sized anodes of silicon which are produced on conductive (e.g., metal coated or boron (B)-doped) silicon wafer substrates.

It is a further aspect of at least one embodiment of the invention to provide for nano-sized anodes for a PC suitable for use as personnel dosimeters, micro in-vivo dosimetry for medical use, in-situ gas monitors, hand-held radiation detectors, radio-chemistry monitors, and environmental monitors.

It is yet a further aspect of at least one embodiment of the present invention to provide a proportional counter for a radiation detector comprising an enclosure filled with a gas having located therein a proportional counter and an absorption zone in which a gas is ionized by radiation; wherein, the proportional counter has at least one nanostructured anode selected from the group consisting of carbon nanofibers, carbon nanotubes, nano-sized silicon and combinations thereof, and at least one cathode which is separated by an insulating material layer.

It is yet a further aspect of at least one embodiment of the present invention to provide a process of forming a nanostructured anode for a proportional radiation counter comprising the steps of providing a substrate; providing metal catalyst locations on the substrate using plasma enhanced chemical vapor deposition; and, forming the carbon fibers on the surface of substrate, the carbon fibers providing an anode within a proportional radiation counter.

It is yet a further aspect of at least one embodiment of the present invention to provide an anode for proportional radiation counter comprising an array of vertically aligned nanostructures selected from the group consisting of carbon nanofibers, carbon nanotubes, nano-sized silicon and combinations thereof, positioned on a substrate, each of the nanostructures having a diameter between 100 to 200 nanometers and a spacing between nanostructures of between 1 to 10 microns.

It is yet a further aspect of at least one embodiment of the present invention to provide an anode for a proportional radiation counter comprising a plurality of vertically aligned nanostructures selected from the group consisting of carbon nanofibers, carbon nanotubes, nano-sized silicon and combinations thereof, that form an array of tubular structures having a spacing preferably between about 3 to about 10 microns, said spacing being at least about 2.5 times a length of the individual nanostructures.

It is yet a further aspect of at least one embodiment of the present invention to provide an anode array for a proportional radiation counter comprising a plurality of nanostructures selected from the group consisting of carbon nanofibers, carbon nanotubes, nano-sized silicon and combinations thereof, extending a substantial uniform height from a surface of a substrate and positioned opposite of a cathode, with each of the individual nanostructures being spaced from an adjacent nanostructure a distance of at least about 2.5 times the length of the nanostructure.

It is yet a further aspect of at least one embodiment of the present invention to provide a process for forming a nanostructured anode for a proportional radiation counter comprising the steps of providing a substrate; providing a metal mask on said substrate using photolithographic techniques; etching away exposed silicon surfaces using a reactive gas, thereby leaving behind a Si nanostructure where the metal mask was deposited; and removing the metal mask from the Si nanostructure.

These and other features, aspects, and advantages of the present invention will become better understood with reference to the following description and appended claims.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

FIGS. 1A and 1B are scanning electron micrographs of a vertically aligned carbon nanofiber (VACNF) illustrating fiber growth from the surface of catalytic sites.

FIGS. 2A and 2B are scanning electron micrograph images of Si posts in which Si pillars are formed through an etching process.

FIGS. 7A-7C indicate various configurations of arrayplates, intercalated arrays, and Spindt electrodes that are useful according to the present invention.

DESCRIPTION OF THE PREFERRED EMBODIMENT

Figure 3A:
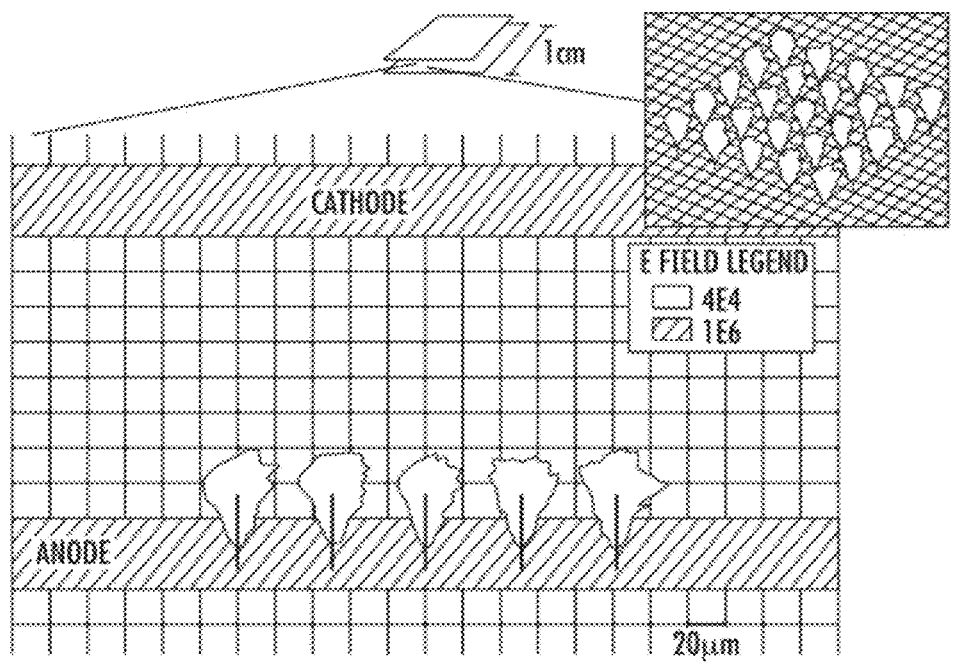
FIGS. 3A and 3B are respective schematic and apparatus views of two parallel plate electrodes using a Si nano-structured array as an anode, an aluminum plate as a cathode and which are separated by a spacer.

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

In accordance with the present invention, varying diameter anodes of tungsten (W) wire, carbon fibers, and carbon nanotubes (CNTs) were utilized to quantify changes in the proportional region operating voltage and for detection efficiency. As was predicted by electrical field theory, the electric field increases as the diameter of the anode decreases. This behavior can be seen by an associated reduction in the voltage bias required for a PC to operate in the proportional region. The materials, methods, and results are best set forth in the publication entitled *Toward a Carbon Nanotube Anode Gas-Filled Radiation Detector*, T. A. DeVol, et al., Nucl. Instr. and Meth. A (2010) and which is incorporated herein by reference.

As set forth in the above incorporated publication data indicates that a CNT anode can result in significantly higher detection efficiencies relative to a single CNT. Results are indicative that a CNT anode array, or other conductive nanoscale arrays (e.g., B-doped or metal coated silicon posts) can provide the high electronic field anode function needed for a PC detector to operate at a lower device voltage bias.

The helium-3 ($^3$He) gas proportional counter (PC) is a recognized standard for neutron detectors. Since 9-11, the Department of Homeland Security has been attempting to deploy neutron detectors at hundreds of domestic and international ports throughout the world to provide detection of special nuclear material. The demand for $^3$He as a fill gas in neutron detectors has, therefore, increased greatly and the available supply of $^3$He is projected to fall significantly short of demand in the near future.

This present invention seeks to develop a neutron detector that can achieve detection efficiencies similar to the $^3$He PC without the use of $^3$He, and, thereby, alleviate the $^3$He shortage. As an alternative to the $^3$He PC detector, a high neutron capture cross section nanoscale PC can be provided which eliminates the need for $^3$He in neutron detection. This approach takes advantage of the large neutron capture cross section of isotopes of elements such as B, Gd, Em, Li, the inherently high electrical field associated with nanoscale anodes in a PC, and the close proximity of the neutron capture material to the anode (point of charge collection for the secondary ionizing radiation source). Two possible designs for this approach are; neutron capture material incorporated directly into nanoscale anode itself; and/or incorporating the neutron capture material into the substrate of the anode array or the cathode counter-electrode.

For purposes of illustration, the present application discusses the use of $^{10}$B but is understood by one having ordinary skill in the art that other elements with an even higher neutron capture cross section could be utilized using a process and material described herein.

The present invention achieves two objectives: (1) identify the methods to produce nano-scale anode arrays, and (2) PC designs that incorporate neutron capture material into the PC device structure in the anode and/or in another part of the device.

Nanoscale arrays with controlled pitch (i.e., nano-anode spacing) and anode size have been fabricated. Arrays of both vertically aligned carbon nanofibers (VACNFs) and silicon nanostructured posts have been produced on p-type <100> B-doped silicon wafer substrates. The arrays produced comprised nanostructures that were ~100 and 200 nm in diameter, 1-3 microns in length and spacings (i.e., pitches) of 1, 2, 3, 5 or 10 microns. It has been found that pitches of about 2.5 times the height are required to maintain the high electric field associated with nanoscale structures. The use of B-doped silicon wafers provides both a conductive substrate and an array material already doped with the B to enhance neutron capture. Use of pre-doped Si wafers may eliminate or minimize the need to further dope or coat the nanostructures or Si substrate.

For fabrication, arrays were defined using electron beam lithography to deposit 100 and 200 nm diameter metal catalysts (VACNFs) or masks (Si posts) with the previously mentioned pitches. The VACNF arrays were subsequently grown at the metal catalyst locations using plasma enhanced chemical vapor deposition (PE-CVD), while the silicon posts were etched using reactive ion etching (RIE). In the case of PE-CVD, the metal deposited (e.g., Ni) during the electron beam lithography process acts as a catalytic site from where the carbon fibers grow up from the surface (FIGS. 1A & 1B). In contrast, in RIE the metal (e.g., Cr) acts as a mask applied using photolithographic techniques. Reactive gases are then introduced to etch away the exposed Si surface, leaving behind Si pillars where the metal was deposited (FIGS. 2A & 2B).

Figure 3B:
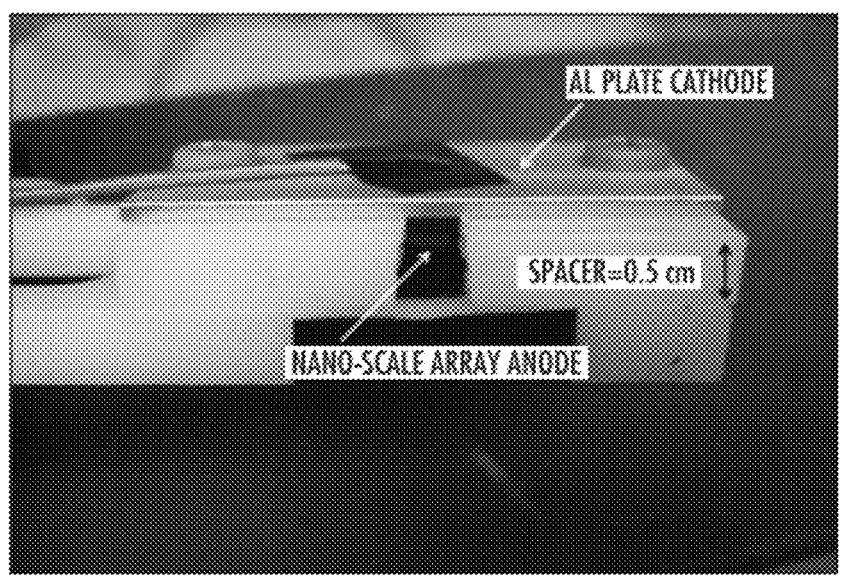
Figure 4:
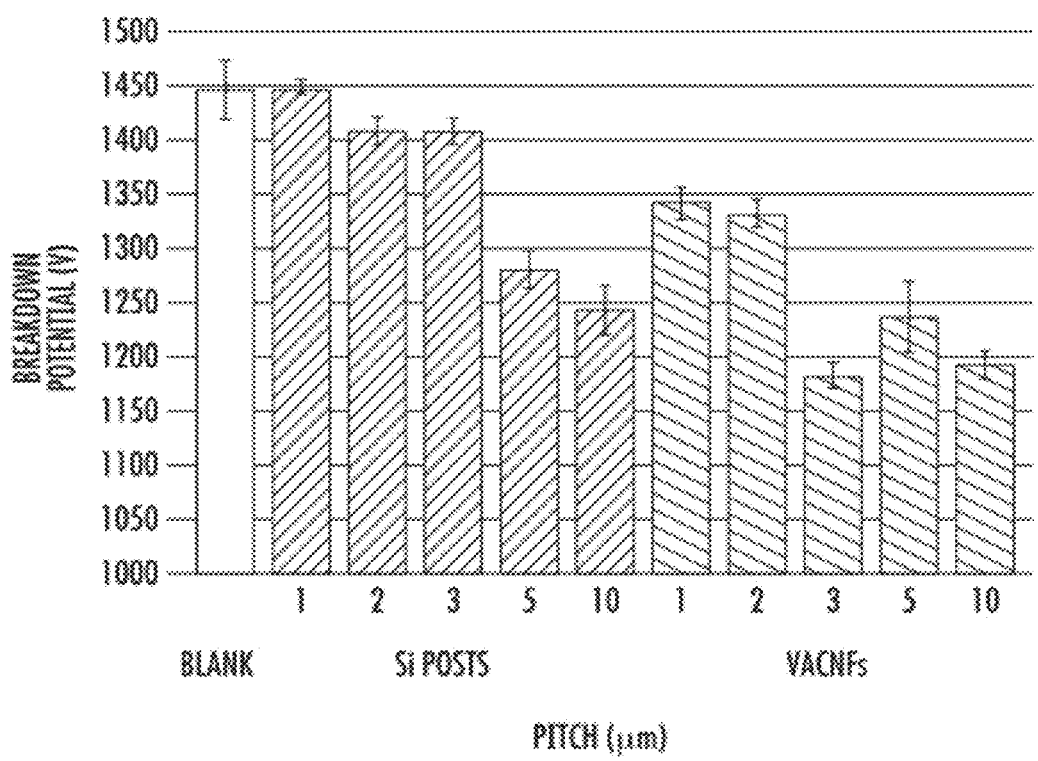
FIG. 4 sets forth data indicating a lowering in a breakdown potential using VACNFs and Si post arrays having pitches greater than 3 and 5 microns, respectively.

Testing of the electrical properties of the nanostructured arrays as well as proportional counting experiments have been conducted with two parallel plate electrodes including Si wafer with the nanostructured array as the anode and an aluminum plate as the cathode which are separated by a spacer as seen in FIGS. 3A & 3B. The electrodes were connected to a preamplifier, a high voltage source, a multichannel analyzer and an oscilloscope to measure pulse heights. Alternative electrode configurations are seen in reference to FIG. 7A-7C showing variations of an array-plate, intercalated arrays, and Spindt design configurations. The electrical properties of the nanostructured arrays were tested by measuring the high voltage gas breakdown (an indirect measure of electrical field strength) between the array and aluminum cathode plate in parallel plate geometry. Breakdown studies were conducted in He at atmospheric pressure with an electrode gap of 0.5 cm. Under these conditions, the unstructured (i.e., flat) B-doped Si wafer gave a breakdown potential (potential where current flow starts) of 1450±30 V. The electric field strength associated with the nanostructures should be much higher than that of the blank Si wafer at the same potential and would be expected to result in a lowered breakdown potential. The arrays of Si posts with pitches of 1, 2, 3, 5, and 10 microns gave breakdown potentials of 1450±10, 1410±10, 1410±10, 1280±20, and 1240±20 V, respectively. The arrays of VACNFs with pitches of 1, 2, 3, 5, and 10 microns gave breakdown potentials of 1340±20, 1330±10, 1180±10, 1240±30, and 1190±10 V, respectively. These data are plotted in FIG. 4, showing a lowering in breakdown potential with the Si post arrays having pitches greater than 5 microns, while all of the VACNF arrays show a lower breakdown potential. The greatest decrease in high voltage breakdown was observed with the 3, 5, and 10 micron pitches, a result that is consistent with electric field modeling that predicted a spacing of at least 2.5 times the length of the nanostructure was required to preserve the electric field strength associated with the nanostructure.

Figure 5:
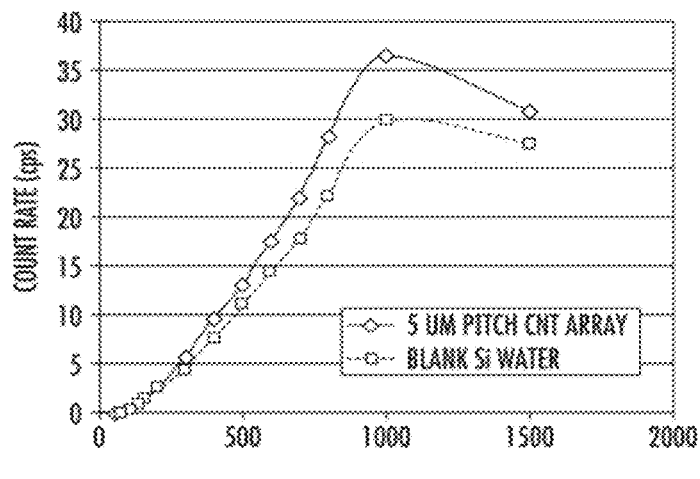
FIG. 5 is a graph setting forth an increased count rate for 5 and 10 micron pitches compared to a control utilizing a boron doped Si wafer.

An evaluation of the proportional response of the VACNFs and Si post nanoscale arrays arranged in parallel plate geometry with a 10 mCi Am-241 gamma source was conducted. The nanoscale arrays with 5 and 10 micron pitches exhibited an increased count rate compared to a blank B-doped Si wafer at the same applied potential (see FIG. 5). An increase in count rate was also observed with the 100 nm diameter VACNFs and Si posts compared to 200 nm diameter VACNFs arrays.

Nanoscale arrays of both VACNFs and Si posts have been coated with B layers of varying thickness (50 and 150 nm) using a metal evaporation chamber.

Figure 6:
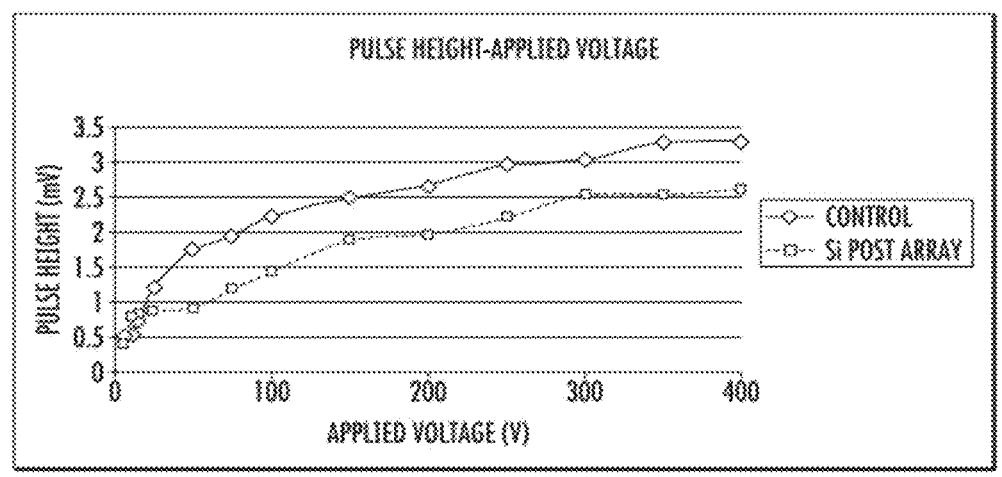
FIG. 6 is a graph setting forth pulse height data versus applied potential for the indicative arrays.

These arrays have also been evaluated as PC anodes using a 10 mCi Am-241 source and a 2 mm parallel plate spacing. Si post arrays with post diameters of 100 nm and a pitch of 10 um coated with a 50 nm layer of B show that the proportional region is reached around 50 V (FIG. 6). The plot of pulse height versus applied potential for the arrays in FIG. 6 begins to flatten around 150 V and then increase again at 200 V. The first rise is most likely due to the alpha radiation from the source, while the second rise can be attributed to Am-241 gamma radiation. This can be compared to control experiments (FIG. 6) in which Si wafers coated with 50 nm B and no arrays present served as the PC anode. With control samples (i.e., Si wafers without nanostructures) the detector did not reach the proportional region before arcing between the anode and cathode plates occurred.

A number of proportional radiation counters are known in the art and could be modified to incorporate the anode materials and construction described herein. Proportional radiation counters include those seen in U.S. Pat. Nos. 5,742,061, 7,902,513, and 6,933,506 all of which are incorporated herein by reference.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The invention claimed is:

1. A proportional counter for a radiation detector comprising:
   an enclosure filled with a gas having located therein a proportional counter and an absorption zone in which a gas is ionized by radiation;
   wherein, the proportional counter has at least one nanostructured anode comprising nanostructures selected from the group consisting of carbon nanofibers, carbon nanotubes, nano-sized silicon and combinations thereof, with a spacing between nanostructures of at least 2.5 times the length of the nanostructures and at least one cathode, with the at least one anode and at least one cathode being separated by an insulating material layer.

2. The detector according to claim 1 wherein the proportional counter incorporates a plurality of anodes arranged in a same first plane on a substrate and a plurality of cathodes arranged on a substrate in a plane parallel to the first plane.

3. A process of forming a nanostructured anode for a proportional radiation counter comprising the steps of:
   providing a substrate;
   providing metal catalyst locations on a surface of said substrate using plasma enhanced chemical vapor deposition sized for depositing metal catalysts having diameters between 100 to 200 nanometers; and,
   forming carbon fibers on the surface of the substrate by forming an individual carbon fiber at each of the metal catalyst locations on the surface of the substrate, the carbon fibers providing an anode within a proportional radiation counter.

4. An anode for a proportional radiation counter comprising:
   an array of vertically aligned nanostructures selected from the group consisting of carbon nanofibers, carbon nanotubes, nano-sized silicon and combinations thereof, positioned on a substrate, each said nanostructure having a diameter between 100 to 200 nanometers and a spacing between nanostructures of between 1 to 10 microns.

5. An anode for a proportional radiation counter comprising:
a plurality of vertically aligned nanostructures selected from the group consisting of carbon nanofibers, carbon nanotubes, nano-sized silicon and combinations thereof, that form an array of tubular structures having a spacing of between about 3 to about 10 microns, said spacing being at least about 2.5 times a length of the individual nanostructures.

6. An anode array for a proportional radiation counter comprising:
a plurality of nanostructures selected from the group consisting of carbon nanofibers, carbon nanotubes, nano-sized silicon and combinations thereof, extending a substantial uniform height from a surface of a substrate and positioned opposite of a cathode, each said individual nanostructure being spaced from an adjacent nanostructure at a distance of at least about 2.5 times the length of the nanostructure.

7. A process for forming a nanostructured anode for a proportional radiation counter comprising the steps of:
providing a substrate;
providing a metal mask on said substrate using photolithographic techniques;
etching away exposed silicon surfaces using a reactive gas, thereby leaving behind a silicon (Si) nanostructure where the metal mask was deposited; and removing the metal mask from the Si nanostructure to form a Si nanostructured anode within a proportional radiation counter.

8. The process according to claim 3 wherein the providing metal catalyst locations on a surface of said substrate using plasma enhanced chemical vapor deposition comprises controlling the spacing between the individual carbon fibers to maintain an electric field strength associated with the carbon fibers.

* * * * *